(12) United States Patent
Bosch I Bosch

(10) Patent No.: US 9,623,344 B2
(45) Date of Patent: Apr. 18, 2017

(54) SEAWATER, BRINE OR SEWAGE SOLAR DESALINATION PLANT, AND DESALINATION METHOD

(75) Inventor: Angel Bosch I Bosch, Barcelona (ES)

(73) Assignee: UNIVERSITAT POLITECNICA DE CATALUNYA, Barcelona (ES)

( * ) Notice: Subject to any disclaimer, the term of this patent is extended or adjusted under 35 U.S.C. 154(b) by 628 days.

(21) Appl. No.: 14/006,476

(22) PCT Filed: Mar. 22, 2012

(86) PCT No.: PCT/ES2012/000070
§ 371 (c)(1),
(2), (4) Date: Nov. 5, 2013

(87) PCT Pub. No.: WO2012/127081
PCT Pub. Date: Sep. 27, 2012

(65) Prior Publication Data
US 2014/0054159 A1 Feb. 27, 2014

(30) Foreign Application Priority Data
Mar. 22, 2011 (ES) .................................. 201130414

(51) Int. Cl.
*C02F 1/14* (2006.01)
*B01D 1/14* (2006.01)
(Continued)

(52) U.S. Cl.
CPC ............... *B01D 1/14* (2013.01); *A01G 9/243* (2013.01); *B01D 1/0005* (2013.01);
(Continued)

(58) Field of Classification Search
CPC .......... C02F 1/14; C02F 2103/08; B01D 1/14; B01D 1/035; B01D 1/0005; B01D 5/0066; A01G 9/243; Y02P 60/124
See application file for complete search history.

(56) References Cited

U.S. PATENT DOCUMENTS 3,138,546 A * 6/1964 Muller ..................... C02F 1/14
137/578
4,343,683 A 8/1982 Diggs
(Continued)

FOREIGN PATENT DOCUMENTS

AU 2010224409 A1 10/2011
DE 31 22 312 A1 12/1982
(Continued)

OTHER PUBLICATIONS

Machine language translation of FR 2851766 A1, obtained from Espacenet, <http://translationportal.epo.org/emtp/translate/?ACTION=description-retrieval&COUNTRY=FR&ENGINE=google&FORMAT=dccdb&KIND=A1&LOCALE=en_EP&NUMBER=2851766&OPS=ops.epo.org/3.1&SRCLANG=fr&TRGLANG=en> by the examiner on Mar. 15, 2016.*

(Continued)

*Primary Examiner* — Christopher A Hixson
(74) *Attorney, Agent, or Firm* — RatnerPrestia

(57) ABSTRACT

A tent or covering with a pyramid-shaped structure, with an inner dark-colored sheet and an outer transparent sheet, installed on a supporting base anchored to the ground or on floats on the surface of the sea, wherein in the apex of the pyramid there are included vaporizers with micronebulizers for nebulizing the water to be treated, a device for capturing humid air through a continuous or sectioned condensation column and for subsoil distillation and heat dissipation in the smaller, water-collecting tank and recirculation of the air devoid of humidity into the enclosure. In addition, it includes a computerized control system of the processes includes controls of the air and nebulized water flow rates and of the working regime of the facility.

12 Claims, 2 Drawing Sheets

(51) Int. Cl.
    *A01G 9/24*     (2006.01)
    *B01D 1/00*     (2006.01)
    *B01D 5/00*     (2006.01)
    *C02F 103/08*     (2006.01)

(52) U.S. Cl.
    CPC ......... *B01D 1/0035* (2013.01); *B01D 5/0066* (2013.01); *C02F 1/14* (2013.01); *C02F 2103/08* (2013.01); *Y02P 60/124* (2015.11); *Y02W 10/37* (2015.05)

(56) References Cited

U.S. PATENT DOCUMENTS

| | | | |
|---|---|---|---|
| 5,588,779 A * | 12/1996 | Merrett | G01F 23/56 405/54 |
| 6,274,004 B1 * | 8/2001 | Andersen | C02F 1/14 159/903 |
| 6,500,216 B1 * | 12/2002 | Takayasu | B01D 1/16 159/4.01 |
| 2012/0228114 A1 * | 9/2012 | Joseph, III | B01D 1/0035 202/172 |

FOREIGN PATENT DOCUMENTS

| | | |
|---|---|---|
| EP | 0 626 345 A1 | 11/1994 |
| EP | 1 443 025 A1 | 8/2004 |
| ES | 426199 A1 | 1/1977 |
| ES | 8604071 A1 | 6/1986 |
| ES | 2 078 885 A1 | 12/1995 |
| ES | 2 109 888 A1 | 1/1998 |
| ES | 2 185 514 A1 | 4/2003 |
| ES | 2 346 605 A1 | 10/2010 |
| FR | 2 851 766 A1 | 9/2004 |
| FR | 2 957 388 A1 | 9/2011 |
| GB | 2464724 A | 4/2010 |
| WO | WO 2005/042411 A1 | 5/2005 |
| WO | WO 2009/073929 A1 | 6/2009 |

OTHER PUBLICATIONS

Goosen, M. F. A. et al. "Solar energy desalination for arid coastal regions: development of a humidification-dehumidification seawater greenhouse." Solar Energy (2003) 75 413-419.*

International Search Report for PCT/ES2012/000070 mailed Jun. 22, 2012.

* cited by examiner

SEAWATER, BRINE OR SEWAGE SOLAR DESALINATION PLANT, AND DESALINATION METHOD

This application is the U.S. National Phase Application of PCT/ES2012/000070, filed Mar. 22, 2012, which claims priority to Spanish Patent Application No. P201130414, filed Mar. 22, 2011, the contents of such applications being incorporated by reference herein.

FIELD OF THE INVENTION

The invention, as set forth in the statement of the present descriptive specification, refers, in a first aspect, to a seawater, brine or sewage solar desalination plant.

The invention concerns, in a second aspect, a seawater, brine or sewage solar desalination method.

The invention pertains to the technical field of water treatment by desalination and evaporation using solar energy. In particular, it allows the desalination of seawater and the recovery of usable salt.

More in particular, an aspect of the invention centres on a seawater, brine or sewage solar desalination plant through an irradiation capturing tent or marquee that is advantageously light, and the condensation in a column that defines a closed enclosure, based on the captured calories and the frigories available in the subsoil. System variables monitoring is effected by a computer through a value-capturing computer programme and search for a regime of optimum performance.

The water desalinator of the invention is based on the capture of heat by means of sun-exposed parallel outer and inner transparent and black sheets, respectively, in the shape of a pyramid concentrating the hot air in its apex. Here, by means of micronebulisers, seawater is evaporated, which will be drawn into a condensation column that, in a first simple form, leads it to the subsoil, whose temperature causes the condensation of the vapour therein.

In a second option, the throughput is improved through the inclusion in the condensation column of sectioned chambers wherein condensation is effected so as to retrieve the latent heat of evaporation, which is transferred to the salt water to be vaporised.

Since external conditions—irradiation, air and captured water temperatures—are variable throughout the day and in the different days of varying years, obtaining maximum performance with one single working regime—air and water flow rates, pressure and temperature regime—is unthinkable. Thereby, a computerised control system is proposed that, capturing the values of the variables and the performance at all times, will build the mathematical functions on empirical data so as to determine the linkage among the variables and will look for the relative maximums to optimise performance in every case—statistical adjustment methods by least squares and widespread linear and non-linear models—. It would be a continuously self-learning system.

BACKGROUND OF THE INVENTION

Currently, and as a reference to the state of the art, it must be noted that various systems of water desalination are known; however, the applicant is not aware of any other plants or similarly applicable inventions that present technical characteristics similar to the ones presented by the one recited herein.

In this regard, it is to be noted that many methods for separating water from salts have been reviewed, starting with reverse osmosis, which is the one most widely implanted throughout the world recently, with large energetic costs and facility investments, and ending with flash-effect distillation, which is the one desalting the largest amount of water, although it is associated with small facilities as well as large energetic costs. The above-mentioned proposals resort to conventional energy sources, which makes them very expensive to operate.

Based on renewable energies there are those that, on the one hand, take their energy from hydrothermal sources or waste energy in facilities such as thermoelectric plants and those resorting to sunlight or the wind.

Within those taking the sun as their source of energy there have been several proposals throughout the years, with various efficiencies and complexities. The most recent and successful so far is the one presented by the British company Seawatergreenhouse®, which has facilities in Santa Cruz de Tenerife, Oman and the United Arab Emirates and which is the one coming closest to the one proposed herein. It also consists of a large greenhouse that acts as a heat collector, but the evaporation is carried out on an evaporation panel on one of the walls and the condensation is effected thanks to the capture of cold seawater coming from great depths so as to reuse it in the evaporation. Document AU 2010224409-A1, of said company, describes one exemplary embodiment of this technology.

The primary objective of these facilities is the greenhouse rather than the desalination and, in fact, the desalted water is used therein. The efficiencies are not optimised for a maximum throughput and the technical solutions are different from and less efficient than the one proposed herein. They do not use the subsoil as a cooler (in their case, they are dependent on the availability of sea water from great depths so as to have enough frigories) and, in addition, they do not use computer optimisation or the concentration of warm air proposed in the pyramidal structure.

In a similar fashion and in relation to the subject matter, the existence of the following documents must be mentioned: ES 426199, ES 8604071, ES 2346605 A1, ES 2078885 A1, ES 2109888 A1, ES 2185514 A1, FR 2957388 A1, U.S. Pat. No. 4,343,683, EP 626345 A1. This background art describes, in general, solutions based on the evaporation of the water to be treated by solar energy and the subsequent condensation of the water vapour to retrieve the usable water.

The invention, which is based on the use of solar energy, the evaporation of the water to be treated and the condensation of the humid air resulting from the evaporation, proposes an efficient solution for said treatment cycle, in addition to affording important improvements regarding the retrieval of usable water and salt, with high throughput, and providing an inhabitable enclosure susceptible of exploitation for various uses (agriculture, living space, etc.).

DISCLOSURE OF THE INVENTION

The desalination of seawater (or other brackish or residual waters, although the invention will concentrate on the former) is the tool that can presently allow obtaining fresh water, the only limitation being the energy required to separate the water from the salt contained therein. This is currently done with the technique of reverse osmosis or other procedures that involve large economic expense because of the required amount of energy and the cost of the facilities.

Taking into account that fresh water is more necessary where there is also the greatest insolation, the system being proposed is based on the exploitation of solar heat and allows for the exploitation of the insolation to vaporise and distil water. In addition, the system allows for the greatest performance during the months with the greatest hydric need. Another of its advantages is that the energy expenditure is extremely low, since most of the necessary energy comes from the sun (except for a small amount of electric energy for the general operation of the system, which can also come from the sun by means of photovoltaic panels).

Specifically, the seawater desalination plant advocated by the invention consists of a solar heat collector by means of a structure or surface made of a dark-coloured material (in order to keep the maximum amount of heat) and of another transparent surface parallel to the former, for instance in the shape of a pyramidal tent, an interspace being defined therebetween that will generate a layer of heated air that ascends to the tent apex.

The pyramidal shape of said structure allows for the accumulation of heat in its apex until high temperatures are provided therein that allow for the vaporisation of seawater injected through micronebulisers. This gives rise to humidity-laden air that is drawn (through a sucking device) by a central tube (axial to the pyramid) or condensation column that directs it to a 'cold spot' constituted by one or more tanks located underground. With the objective of having a closed circuit of air that will allow its circulation with one single compressor, there is a smaller closed tank inside a larger one that comprises a network of tunnels and storage of a surplus of water and its corresponding frigories for the dissipation of heat and the condensation of vapour. A drip cock transfers the water produced in the small tank towards the tunnels.

Along the path of the seawater that is to be blown in, it has gone through a vertical tube inside the condensation column that transports the air-vapour mixture countercurrent, thereby permitting the latter's condensation in the form of fresh water through a heat exchanger: humid air-seawater; the input salt water has been heating up. Circulation is always countercurrent. On the spots where the temperature to be dissipated is higher, the temperature of the collecting element is higher, and vice versa. This way, the efficiency of the calorie recovery process is ensured.

In turn, the partially cooled off air and part of its condensed water load reach the previously mentioned tank, wherein it cools off even further as a result of the latter's being in the subsoil, which always maintains lower temperature (coldest spot of the entire process).

The maximum condensation of the contained water occurs in this point. This air returns to the top, where it progressively heats up while, at the same time, it favours the condensation of the humid air circulating in the opposite direction along a stretch, also with a heat exchanger and countercurrent once again.

Night-time cooling of underground tunnels or cisterns is required so that a good resource of frigories is available for the system on the next day.

The air circulating through the pipe provided therefor reaches the point where it is once again input into the system at the base of the pyramid, where it can cooperate in the drying up of the remaining salt water that was not vaporised when it exited the micronebulisers; it is heated up with the solar radiation and contributes once again to the vaporisation of water, thus closing the circuit of air.

Sea salt is collected in the lower central area of the pyramid.

The invention also contemplates the incorporation of a computerised process control that will assess variables at all times so as to optimise the performance; all of it using statistical techniques of data collection and the adjustment of complex equations by least squares and widespread linear and non-linear models in a process that can be described as 'self-learning' by the system itself.

The system controls are: flow rate of the air and the nebulised water, facility operation regime. These are assessed and modified (monitored) so as to reach the topmost performance in every case: incidence angle of sunbeams, air and water temperatures, etc.

Unlike other proposals, this facility cannot operate at the same regime all the time, because, as a result of variations in the primary element (the sun) and some secondary ones (air and water temperatures), every hour is different from all the others.

Thus, it can reach the topmost performance through a computerised "self-learning" and parameter monitoring control.

As a whole, the facility consists of very lightweight and cheap materials: polyvinyl sheets, polyethylene pipes and polyester structures reinforced with fibreglass, which makes it possible to install it on the ground, at sea (floating) or on the roof of a house or a group of houses.

Lastly, it is to be noted that the enclosed space in the tent with a pyramid-shaped structure allows other uses, such as dwellings, farms and/or plant nurseries. The environment is comfortable and the system is quiet at night: it stops working when the sun sets. The system itself can use the tunnels and cisterns as a source of heat or cold to acclimatise the space within the tent at will. By not closing the dark sheet pyramid entirely (it only gets so far as a frustopyramidal shape), there is an opening for light to enter the tent that allows its usage as a greenhouse or other uses.

The plant enclosure may have various configurations, among them said quadrangular pyramidal configuration including one single condensation-distillation column, or one configuration with at least a top portion in the elongated triangular dome including several spaced-apart condensation-distillation columns.

In an example plant embodiment located in Ibiza, the calculated theoretical throughput is above 2 $m^3$ annually per $m^2$ of collecting tent (20,000 $m^3$ per Ha, annually, 39° N latitude, Ibiza).

In view of the above, it is established that the described seawater, brine or sewage solar desalination plant represents an innovative structure of heretofore-unknown structural and constitutive characteristics therefor, and with industrial scale results.

DESCRIPTION OF THE DRAWINGS

In order to complement the description being made of the mechanism subject of the invention and in order to further a better comprehension of the characteristics that distinguish it, the present descriptive specification is accompanied, as an integral part thereof, by a plan in which the following is represented with an illustrative, non-limiting nature.

DESCRIPTION OF AN EXEMPLARY EMBODIMENT OF THE INVENTION

Figure 1:
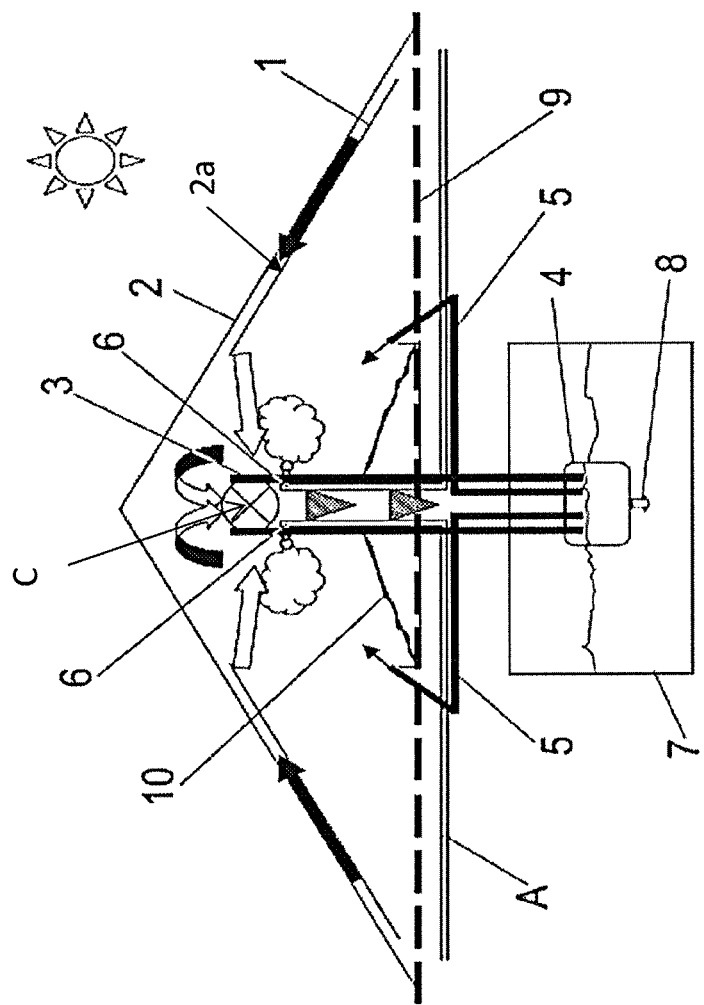
FIG. 1 shows a schematic representation of an exemplary embodiment of the seawater, brine or sewage solar desalination plant subject of the invention wherein the elements it comprises and the system operation are appreciated, arrows representing therefor the circulation movements of the water and the air.

In view of the described and solitary FIG. 1, and in agreement with the numbering adopted for it, the parts and elements that the desalination plant of the invention comprises can be appreciated, and the operation process thereof can be understood.

The plant comprises:

an enveloping structure bounding a closed enclosure 1, in the illustrated example in the shape of a pyramidal tent with an inner dark-coloured sheet (in order to keep the maximum amount of heat) and an outer transparent surface or sheet 2, arranged parallel to the former, so that in the interspace being defined between said two surfaces a layer of heated air that ascends towards the top of the structure will be generated by solar energy;

a vertical column 3 that ends in a region near said top of the enclosure;

a conduit A that provides the water to be treated and that is supported on said column 3;

nozzles 6 for micronebulising the water to be treated, which is pumped through said conduit A towards said build-up area of heated air, producing the vaporisation of water and the evacuation of salt crystals that fall by gravity at the base of column 3, where they accumulate;

pumping equipment for the water to be treated that circulates along conduit A towards said nozzles 6;

a conduit, axial to said column 3, for the capture of humid air through a sucking device C located close to the apex of column 3, in an inlet area to the axial conduit;

a collecting tank 4 for the condensed liquid connected to said humid air-capture column; and air-recirculation tubes 5 from said condensed liquid tank 4 to the interior of enclosure 1.

One characteristic of the plant resides in the fact that a stretch of the conduit (A) providing the water to be treated interferes with the high-temperature, humid air-capture conduit next to the topmost area in the column, whereby the provided water that is to be nebulised heats up, thereby favouring the evaporation process.

In addition, the facility comprises a fresh-water collecting tank 7, which, arranged at a certain depth, for instance underground or submerged underwater at sea, under the condensation column 3, provides a low temperature to the generally smaller tank 4, which is located inside it to allow for condensation. This collecting tank 7 cools off during the night to allow for the evacuation of the heat accumulated during the day in case the system is located on the ground; not so in the case of a floating structure. To that end, the communication of said tank 7 with the exterior is contemplated at a time when its temperature is adequate. In addition, the tank 7 can be connected to tunnels 7a with a system that will make the temperature uniform and allow for good heat dispersion into the subsoil, as well as serving as a cistern to accumulate water at the times of maximum production to be used at the times of maximum consumption.

If the plant is installed at sea, the low temperature of the collecting tank is ensured, since the temperature of the seawater at certain depth is always lower than that of the surroundings (in extreme conditions of isolation).

The FIGURE shows a drip cock 8 incorporated into the smaller tank 4 in order to discharge the latter into the tank 7, since it is turned off so as to allow the circulation of air with one single impeller. As water accumulates in said smaller tank 4, it discharges in the collecting tank 7, which is the one storing the water produced and must provide the necessary frigories to the system.

The least content of the tank 7 that must be kept to ensure this task and the cooling that must be provided at night-time for it to be able to carry out its condensing job on the next day are calculated. In addition, it acts as a cistern.

Said collecting tank 7 is in communication with the outside through at least one conduit 5a for feeding refreshment air from the outside at a time selected by an adequate outside environment temperature.

Figure 2:
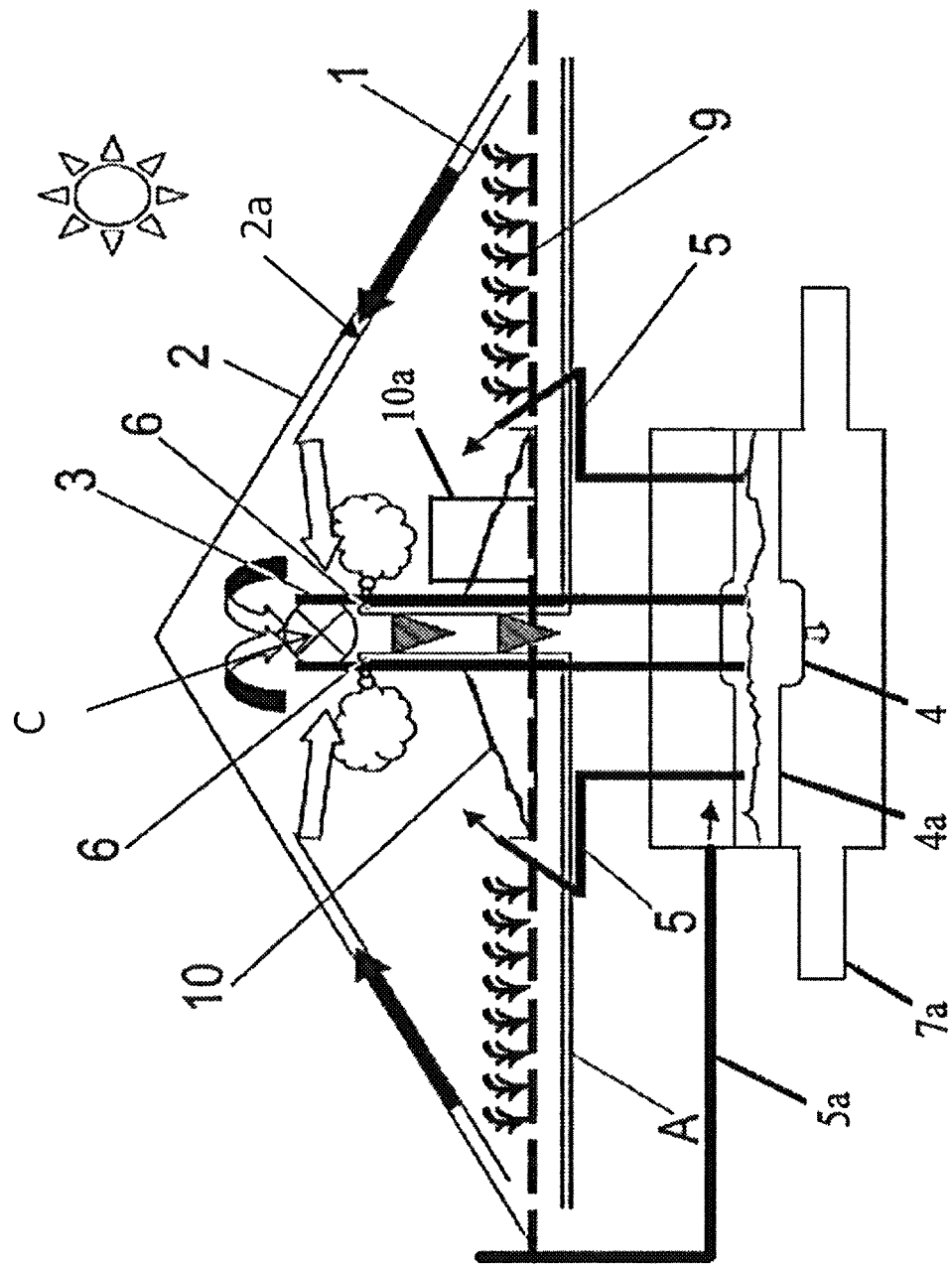
FIG. 2 shows a schematic representation of an exemplary embodiment of the seawater including some additional features not shown in FIG. 1.

According to an embodiment shown on FIG. 2 said smaller tank 4 comprises several branches 4a extending under the base of the closed enclosure, branches 4a from which a communication is established for the return of air deprived of humidity towards the interior of the enclosure by the tubes 5.

A supporting base 9 or installation area is the place where the plant is located and may be either on the ground or on floats on the surface of the sea—broken line—, as well as on the roof of a house, since the weight is not heavy.

The salt collection area 10 that, in the example portrayed, is located in the lower central region of the pyramidal structure 1, is the place where non vaporised water and salt fall as a result of the NaCl molecule being heavier than that of water. At least one entrance 10a and at least one passage to the interior of enclosure 1 are provided for the removal of usable salt, built up at the base of column or columns 3.

On the other hand, the remainder of the bounded space under the transparent covering 2 is useful as a dwelling or for agricultural ends, with a controllable microclimate.

So, the operation of the plant, as already pointed out above, is as follows:

First of all, the seawater (A) to be desalted is injected through a number of micronebulisers 6 provided on top of the condensation column 3, using saturated air collected near the apex to lead it through the condensation column conduit to the lower part of the tent with a pyramid-shaped structure 1.

The apex or topmost part of said pyramidal structure 1 takes in less dense air, which is mostly that loaded with humidity, since, the greater the load of humidity of the air is, the less dense it will be. From here it takes the air that will go through the condensation column 3, which draws it in at its top and leads it towards the smaller tank 4, which is a 'cold spot' and where the collecting tank 7 is located, wherein the water is discharged through the drip cock, and the remaining calories through diffusion. The condensation in the column can be sectioned so as to better retrieve the latent heat of condensation.

Along the path of the seawater that is to be blown in, it has gone through a vertical tube inside the condensation column 3 that transports the air-vapour mixture countercurrent, thereby permitting the condensation in the form of fresh water through a heat exchanger: humid air-seawater.

In turn, the partially cooled off air and part of its condensed water load reach the smaller tank 4 (coldest point of the entire process).

The maximum condensation of the contained water occurs in this point. The air returns to the top, where it progressively heats up while, at the same time, it favours the condensation of the humid air circulating in the opposite direction along a stretch, also with a heat exchanger and countercurrent once again.

The air 5 circulating through the pipes reaches the point where it is once again input into the system at the base of the pyramid, which normally coincides with the support base 9, where it can cooperate in the drying up of the remaining salt water that was not vaporised when it exited the micronebulisers 6; it is heated up with the solar radiation and contributes once again to the vaporisation of water, thus closing the circuit of air.

The invention also contemplates the incorporation of a computerised process control (not shown) comprising: the air and nebulised water flow rate controls and the working regime of the facility.

Thus, the invention provides a method for a seawater, brine or sewage solar desalination method characterised by carrying out one vaporisation step of the water to be treated by microspraying said fluid in a high area of a closed enclosure bounded by a transparent shell, wherein hot air generated by solar energy accumulates, and going on to capture the humid air resulting from the vaporisation in said area and transport it towards a vertical condensation and distillation column (3), completing the condensation and heat dissipation in at least one tank (4, 7) installed in the subsoil or below sea level, and recirculating the captured humid air, discharged of water, towards the interior of the enclosure.

The provision of hot air towards the top of the enclosure, where vaporisation occurs, is carried out by means of a solar collector associated with said transparent shell, and separated therefrom, that provides an ascending sloped interspace.

The invention claimed is:

1. A seawater, brine or sewage solar desalination plant comprising a fresh-water collecting tank in the subsoil or below sea level, and a closed enclosure bounded by a transparent shell installed on a supporting base anchored to the ground or on floats on the surface of the sea, said closed enclosure comprising:
    a dome, triangular cupola or pyramidal upper area;
    a solar collector placed inside the closed enclosure, associated with said transparent shell and separated therefrom comprising a sunlight-capturing surface with a dark finish placed inside the closed enclosure for generating hot air by solar energy, said sunlight-capturing surface with a dark finish being parallel to the outer transparent shell and spaced therefrom, providing an ascending sloped interspace, open at a low level, near said supporting base and open at an upper part so that sunlight is captured and transformed into heat that will warm the air of the interspace carrying hot air towards said upper area and concentrating there;
    vaporizing means including a number of micro nebulizers of the water to be treated in the upper area of the closed enclosure, providing nebulized water where the hottest air is accumulated;
    at least a vertical condensation and distillation column;
    a sucking device for collecting humid air, resulting from the nebulized water evaporation, drawing off the humid air towards an inlet area of said at least a vertical condensation and distillation column, said inlet area being placed in said upper area so that the humid air is pushed down said at least a condensation and distillation column that is communicated with said fresh-water collecting tank wherein a water condensation and a heat dissipation are completed, and
    air recirculation tubes for recirculating the collected humid air, discharged of water, from said fresh-water collecting tank towards the interior of the closed enclosure; and
    wherein the supporting base accumulate salt crystals produced due the evaporation of the water nebulized in the upper area of the closed enclosure and fall by gravity.

2. A desalination plant according to claim 1 wherein:
    at least one conduit for the water to be treated, is supported on said at least a condensation and distillation column;
    said vaporizing means include several nozzles for micro nebulizing the water to be treated towards said upper area where the heated air is accumulated; and
    a pump connected to said at last one conduit for pumping the water to be treated towards said nozzles.

3. A desalination plant according to claim 2 wherein at least one stretch of the conduit for water to be treated is in interference with the high-temperature humid air capturing conduit next to the column upper end area, then absorbing a latent condensing heat in the air of said upper end area.

4. A desalination plant according to claim 1 wherein said fresh-water collecting tank remains inside a larger tank intended for the provision or supply of the recovered usable fresh water, located at a lower level, with a selective communication from one tank to the other by a controlled valve or drip cock wherein said larger tank provides a low temperature and cooling off during night.

5. A desalination plant according to claim 4 wherein said fresh-water collecting tank comprises several branches extending under the base of the enclosure, branches from which a communication is established for the return of air deprived of humidity towards the interior of the enclosure by the tubes.

6. A desalination plant according to claim 5 wherein said fresh-water collecting tank is in communication with the outside through at least one conduit for feeding refreshment air from the outside at a time selected by an adequate outside environment temperature.

7. A desalination plant according to claim 1 wherein said enclosure has a quadrangular pyramidal configuration including one single column or a configuration with at least one upper portion forming an elongated triangular cupola including several columns spaced apart and each of them ending close to said upper portion.

8. A desalination plant according to claim 1 including a computerized processing control system comprising controls of the flow rates of the air and the nebulized water to be treated and of the working regime of the facility.

9. A desalination plant according to claim 4 wherein said collecting fresh-water tank and the larger tank are arranged at some depth under the condensation column.

10. A desalination plant according to claim 9 wherein the larger collecting tank is in communication and contact with subsoil tunnels for heat dissipation.

11. A desalination plant according to claim 1 wherein a salt collection and accumulation area has been provided next to the base of the at least a column and in that the remainder of the bounded space under the transparent covering is useful as a dwelling or for agricultural purposes with a controllable microclimate.

12. A desalination plant according to claim 11 wherein at least one entrance and at least one passage to the interior of enclosure have been provided for the removal of usable salt, built up at the base of the at least a column.

* * * * *